United States Patent
Olsson

(10) Patent No.: US 8,860,522 B2
(45) Date of Patent: Oct. 14, 2014

(54) PHASE AND AMPLITUDE MODULATOR

(75) Inventor: Bengt-Erik Olsson, Hovas (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/125,853

(22) PCT Filed: Oct. 24, 2008

(86) PCT No.: PCT/EP2008/064439
§ 371 (c)(1),
(2), (4) Date: Apr. 25, 2011

(87) PCT Pub. No.: WO2010/045982
PCT Pub. Date: Apr. 29, 2010

(65) Prior Publication Data
US 2011/0204987 A1    Aug. 25, 2011

(51) Int. Cl.
*H04L 27/12* (2006.01)
*H04L 27/20* (2006.01)
*H04L 27/00* (2006.01)
*H04L 27/36* (2006.01)

(52) U.S. Cl.
CPC .......... *H04L 27/0008* (2013.01); *H04L 27/366* (2013.01); *H04L 27/206* (2013.01); *H04L 27/2092* (2013.01); *H04L 27/2096* (2013.01)
USPC ............ 332/103; 332/100; 332/101; 332/104

(58) Field of Classification Search
USPC .................................. 332/100, 101, 103, 104
See application file for complete search history.

(56) References Cited

U.S. PATENT DOCUMENTS

| | | | | |
|---|---|---|---|---|
| 5,020,075 | A * | 5/1991 | Tachika | 375/146 |
| 2007/0104294 | A1 * | 5/2007 | Kim et al. | 375/332 |
| 2008/0112507 | A1 * | 5/2008 | Smith et al. | 375/308 |
| 2008/0136546 | A1 * | 6/2008 | Sasaki et al. | 332/104 |
| 2008/0219378 | A1 | 9/2008 | Aggarwal | |
| 2009/0304053 | A1 * | 12/2009 | Ichiyama et al. | 375/219 |

FOREIGN PATENT DOCUMENTS

JP    2009290753 A    10/2009

OTHER PUBLICATIONS

Machine Translation in English of JP 2009-290753.*

* cited by examiner

*Primary Examiner* — Arnold Kinkead
*Assistant Examiner* — Richard Tan

(57) ABSTRACT

A modulator for an electrical signal comprises a data input port and a clock frequency input port. The modulator also comprises a first phase shifter for subjecting input clock frequency signals to a phase shift and adapted to keep the phase of an input clock frequency signal aligned with the phase of a data stream which is input at the data input port. The modulator also comprises a first XOR gate with an output port, to which first XOR gate said input ports of the modulator are connected, by means of which a BPSK signal is created at the output port when a first data stream is connected to the data input port and a first clock frequency signal is connected to the clock frequency input port.

6 Claims, 6 Drawing Sheets

PHASE AND AMPLITUDE MODULATOR

TECHNICAL FIELD

The present invention discloses a modulator for an electrical signal, and comprises a data input port and a clock frequency input port connected to the modulator via a phase shifter.

BACKGROUND

A radio signal can carry information using both its amplitude and phase, and in modern communication links, multiple instances of both amplitude and phase can also be used in order to transmit multiple bits per symbol using, for example, so called QAM, Quadrature Amplitude Modulation.

Today, QAM generators are found in a great variety of systems ranging from hand-held cellular phones and WLAN equipment to long distance radio trunk stations. All transmitters are based on so called I-Q modulators, in which two analogue base band signals are mixed with a radio frequency, RF, carrier in order to modulate the base band data onto the carrier. The I and Q data are encoded onto 90° phase shifted copies of the RF carrier, and subsequently summed to create a carrier that is modulated in both amplitude and phase.

In radio links, the ratio between the information bandwidth and the carrier frequency, the so called BCR, Bandwidth to Carrier Ratio, is generally quite low, due to bandwidth regulations or other practical bandwidth utilization issues. Recently, there is also an emerging need for modulation technology for use in optical links or systems, in which where virtually no restrictions exist on bandwidth utilization.

However, due to both cost and performance reasons, it can be beneficial to first encode information which it is desired to transmit by optical means onto an electrical carrier or signal via modulation, e.g. QAM, and to then convert the modulated electrical signal into an optical signal. This would provide the advantage of a simplified optical transmitter and receiver structure as compared to a purely optical amplitude and phase modulator.

SUMMARY

As explained above, both in purely electrical systems as well as in systems which use optical signals, there is a need for a modulator which has a higher BCR, Bandwidth to Carrier Ratio, than present systems.

Such a modulator is provided by the present invention in that it discloses a modulator for an electrical signal which comprises a data input port and a clock frequency input port. The modulator also comprises a first phase shifter for subjecting input clock frequency signals to a phase shift, with the phase shifter being adapted to keep the phase of an input clock frequency signal aligned with the phase of a data stream which is input at the data input port.

The modulator of the invention also comprises a first XOR-gate with an output port, with the input ports of the modulator being connected to the first XOR-gate, by means of which a BPSK signal is created at the output port when a first data stream is connected to the data input port and a first clock frequency signal is connected to the clock frequency input port.

Due to this design of a modulator, ultra high bandwidth digital electronics such as XOR gates can be used, which can inherently handle frequencies from DC and upwards without any so called dispersion. Thus, a modulator of the invention can accomplish modulation of very high bit-rate data onto a carrier which is close to or at the same frequency as the bit-rate.

A modulator of the invention can also be highly integrated, for example using digital ASIC technology, which for appropriate production volumes can be extremely cost efficient.

If it is desired to obtain "higher" degrees of modulation, multiple modulators of the invention may be combined in ways which will be described in the following. By means of such combinations, modulations such as QPSK and 16-QAM may be obtained.

Document US 2008/0219378 A1 discloses a design with two separate phase shifters for two separate clock signals,

BRIEF DESCRIPTION OF THE DRAWINGS

The invention will be described in more detail in the following, with reference to the appended drawings, in which.

DETAILED DESCRIPTION

Figure 1:
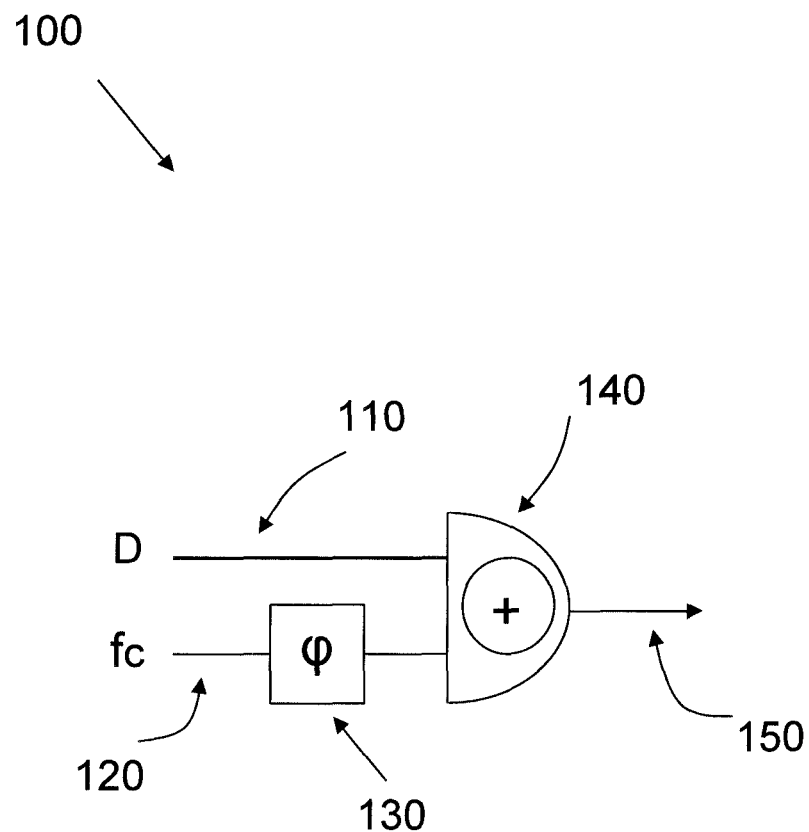
FIG. 1 shows a basic concept of the invention.

FIG. 1 shows a basic embodiment 100 of the present invention. As shown in FIG. 1, the modulator 100 comprises a digital so called XOR (exclusive OR) gate 140, which has a data input port 110 and a clock frequency input port 120. The XOR gate 140 has an output port 150, and a phase shifter 130 is connected so that input clock frequency signals can be subjected to a suitable phase shift. Suitably, the phase shifter 130 is adapted to keep the phase of an input clock frequency signal aligned with the phase of an input data stream.

The exact design of both the phase shifter 130 and the XOR gate 140 can be carried out in a large number of ways, as is known to those skilled in the art, and will for that reason not be described here.

If a data signal is input to the input port 110, and a "clock" or clock frequency signal is input to the clock frequency input port 120, the output of the XOR gate 140 will be as follows:

The output of the XOR gate 140 will be equal to the input clock signal in the case of a digital "0" at the data input port 110, and in the case of a digital "1" at the data input port 110, the output of the XOR gate 140 will contain the clock signal inverted.

Thus, the modulator 100 will act as a phase modulator, creating a binary PSK signal, a BPSK signal, with the carrier frequency determined by the input clock signal.

Figure 2:
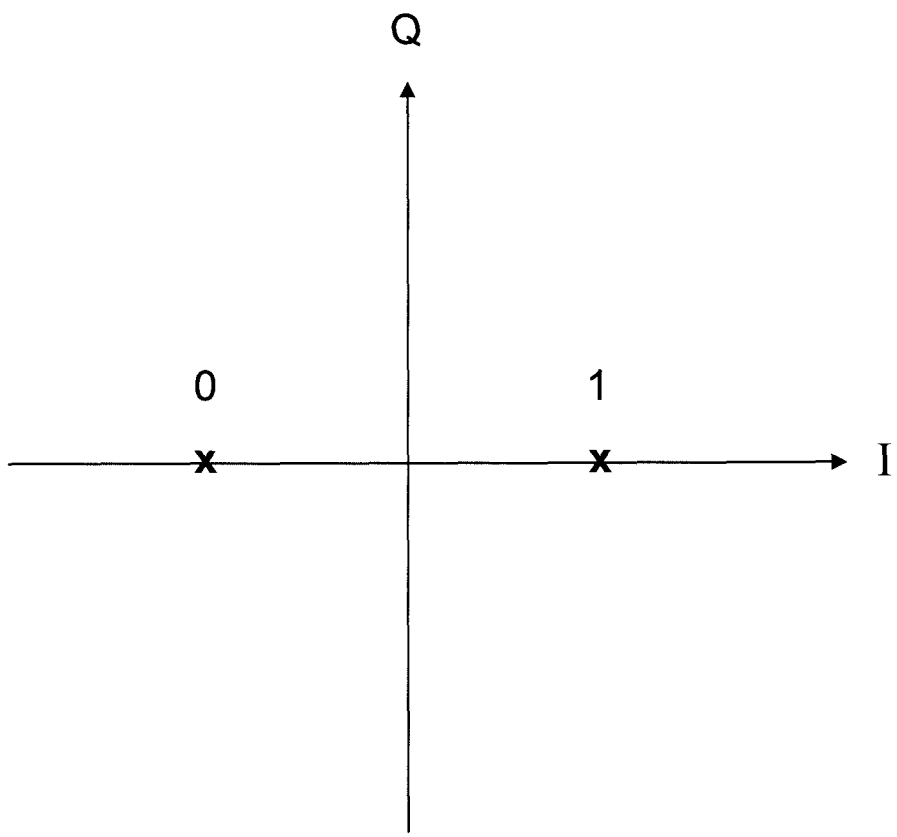
FIG. 2 shows a first modulation pattern.

An example of such a BPSK signal is shown in FIG. 2, which shows an I-Q system with two signals separated by 180 degrees. One of the signals is interpreted as a digital 1, and the other is interpreted as digital 0.

Figure 3:
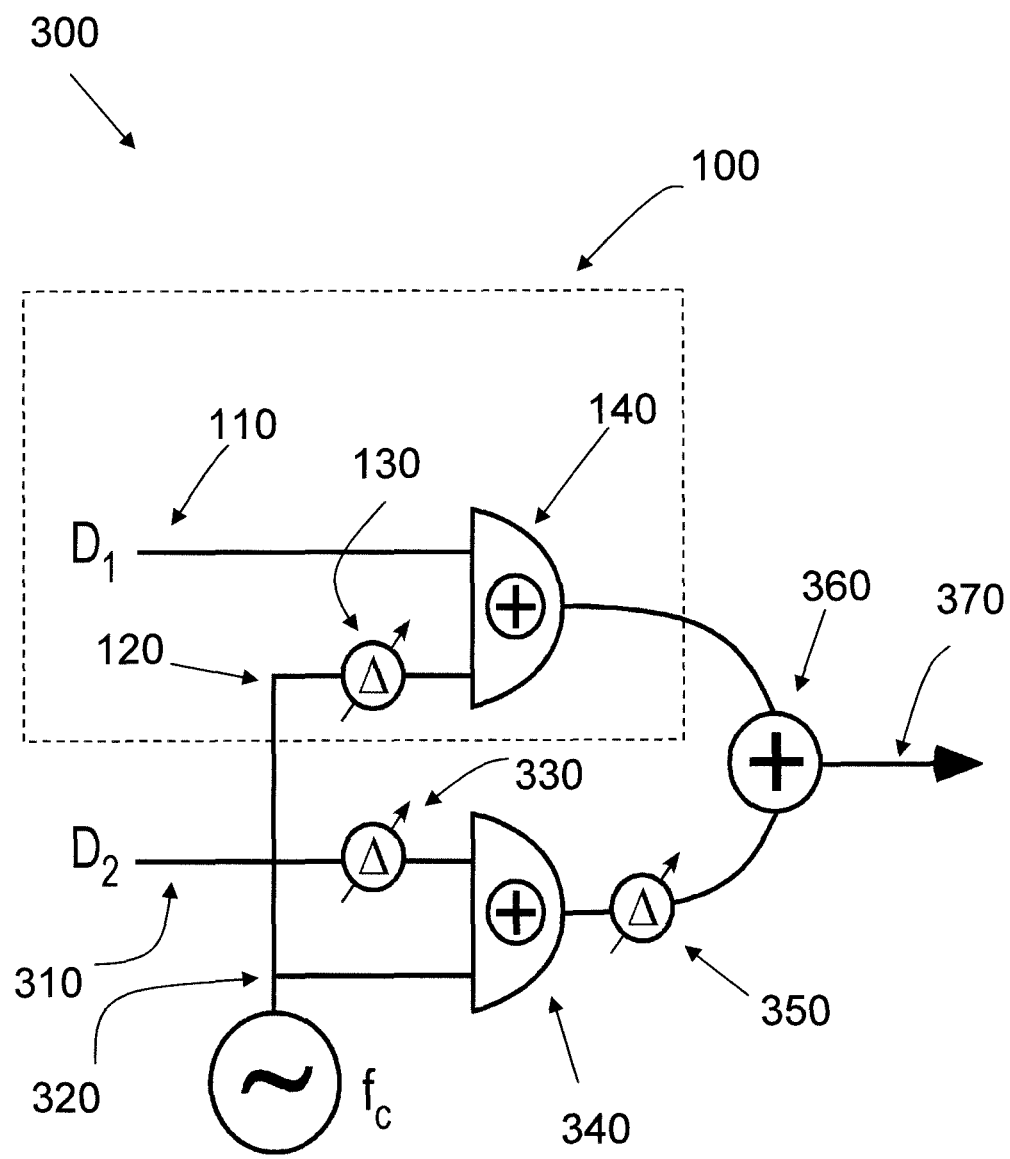
FIG. 3 shows a second embodiment of the invention.

The modulator of the invention can also be used in order to obtain a signal with four different phase states of the clock or carrier signal, in which case what is basically two modulators 100 of FIG. 1 will be combined. Such an embodiment 300 is shown in FIG. 3, which comprises the modulator 100 of FIG. 1, shown in a box with dashed lines and the reference numbers of FIG. 1. In addition, the modulator 300 also comprises a second XOR gate 340 with a data input port 310, a clock frequency input port 320 and an output port.

The modulator 300 additionally comprises a second phase shifter 330 connected to the second XOR-gate 340 at its data input port, and as an alternative or complement to the phase shifter 330, the modulator 300 also comprises a phase shifter 350 at its output port.

The phase shifts obtained through the different phase shifters 130, 330, 350 may vary, but the result which is obtained should be that the difference in phase between the output signals from the two XOR gates 140, 340, is ninety degrees. This can be obtained in a number of ways, for example by letting the two phase shifters 130 and 330 cause zero phase shift, and letting the phase shifter 350 cause a phase shift of ninety degrees, or by letting the phase shifter 130 cause a phase shift of ninety degrees, and by letting the other phase shifters cause a phase shift of zero degrees.

The modulator 300 also comprises a first adder 360 which is connected so that it may add the outputs of the two XOR gates 140, 340, by means of which a QPSK signal, Quadrature Phase Shift Keying, is created when a first D1 and a second D2 data stream is connected to the data input ports 110, 310, of the first and second XOR-gates, respectively, and first and second clock frequency signals are connected to the clock frequency input ports 120, 320, of the first and second XOR-gates respectively.

As indicated in FIG. 3, the clock frequency signal for both of the XOR gates can be generated by one and the same frequency generator fc.

The role of the phase shifter 350 at the output of the second XOR gate is here to ensure that the phase of the carrier or clock signals are aligned with a 90 degree separation between them. As indicated, this can also be performed solely by the phase shifter 330 at the data input port 310 of the second XOR gate. As an alternative, this function can also be performed entirely by the phase shifter 350 or by the two phase shifters 310, 350 in combination.

Figure 4:
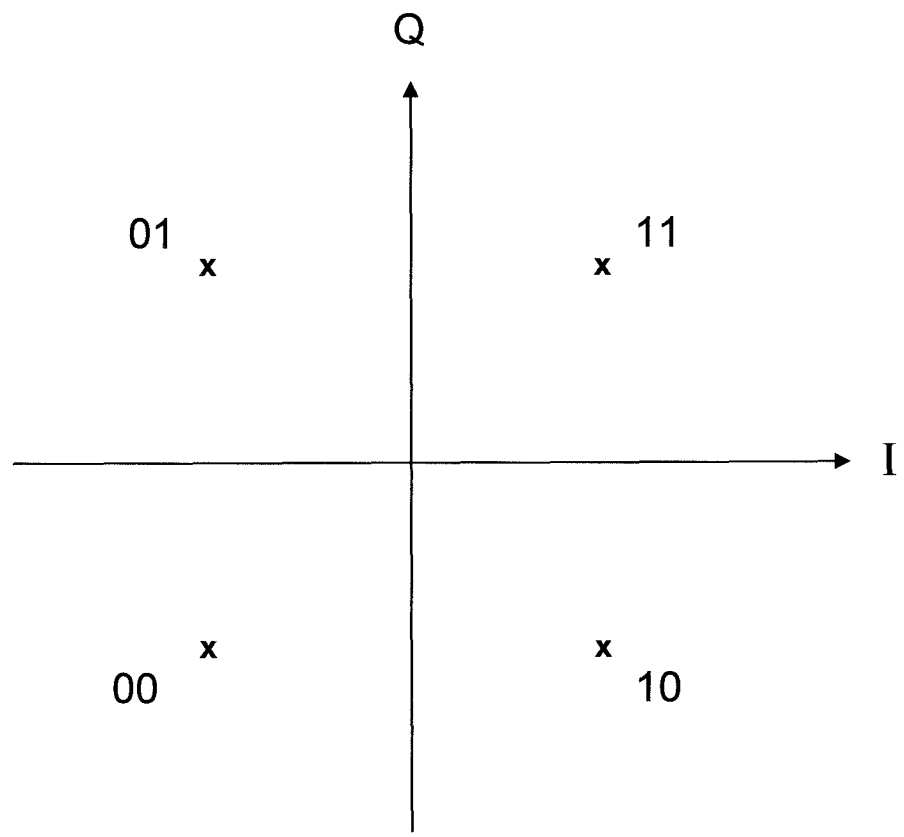
FIG. 4 shows a second modulation pattern.

FIG. 4 shows an example of QPSK signals in an I-Q system: four different phase positions which can be obtained by the modulator 300 of FIG. 3 are shown; next to each phase position, a possible digital value 00-11 for the position is indicated.

Figure 5:
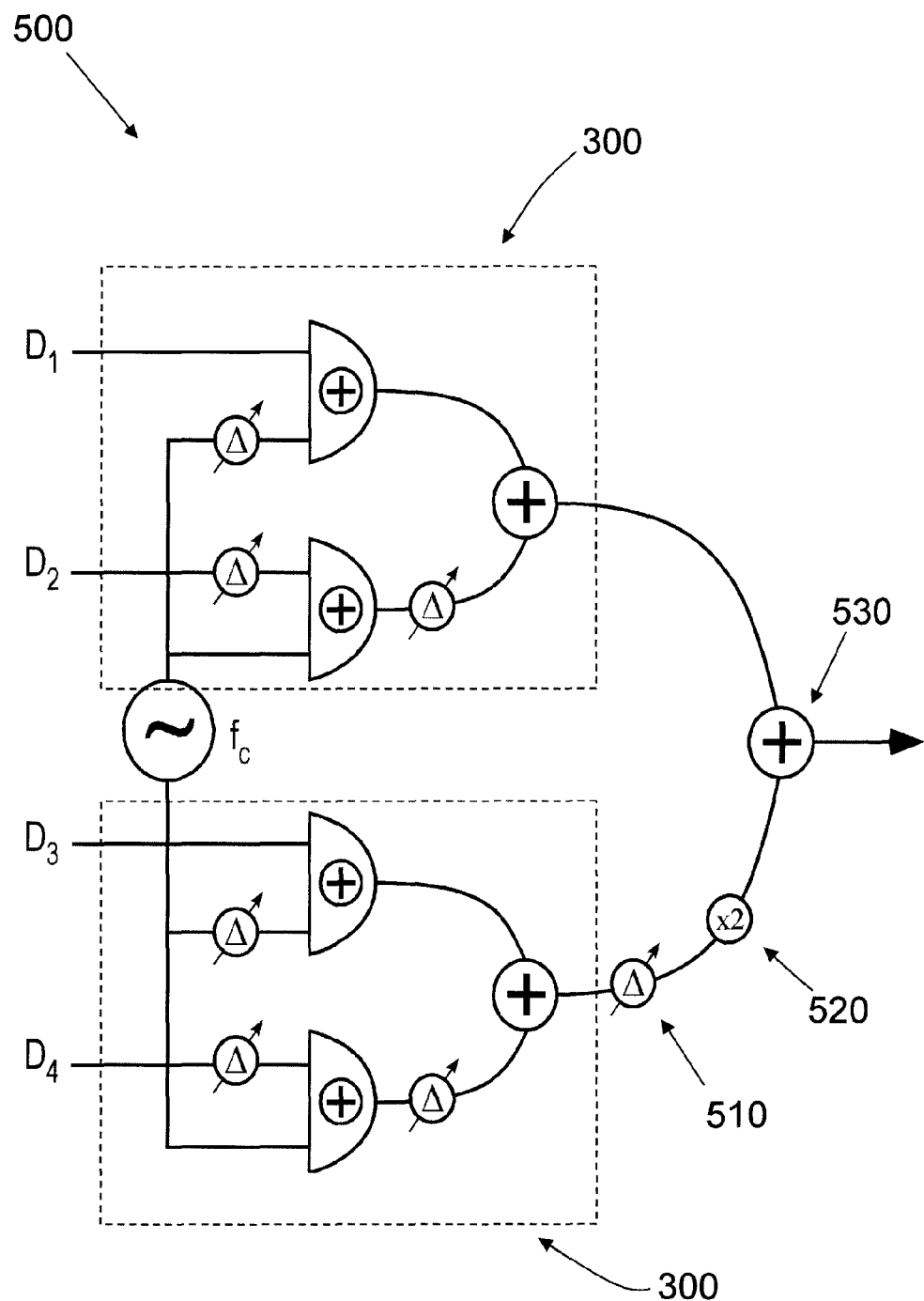
FIG. 5 shows a third embodiment of the invention.

In order to obtain a 16 Quadrature Amplitude Modulation signal, a 16-QAM signal, a combination 500 of two modulators 300 of FIG. 3 can be used, as shown in FIG. 5: each of the two modulators 300 is shown in a box with dashed lines. The reference numbers from FIG. 3 are not repeated in FIG. 5, in the interest of simplicity.

As shown in FIG. 5, the modulator 500, in comparison to the one 300 of FIG. 3, additionally comprises a third and a fourth XOR gate, each with respective data input ports D3, D4, and clock frequency input ports.

As shown in FIG. 5, one of the third and fourth XOR gates comprises a phase shifter at its clock frequency input port while the other XOR gate comprises a phase shifter at its data input port or, alternatively, at its output port.

The modulator 500 also comprises a second adder for adding the outputs of the third and fourth XOR gates, and also has a third adder 530 for adding the outputs of the first and second adders, i.e. essentially for adding the outputs of the two modulators 300.

However, as is also shown in FIG. 5, the modulator 500 in addition comprises a multiplier 520 for multiplying the output of the second adder by a predetermined factor before it is used by the third adder. This factor is necessary in order to obtain the use of not only phase but also of amplitude, as is the case in 16-QAM.

Suitably, but not necessarily, the multiplication factor is two, depending on which constellation of symbols it is desired to obtain in the "16-QAM space".

In addition, the modulator 500 may also comprise a phase shifter 510 between the second and third adder, in order to maintain a zero degree difference in phase between the inputs to the third adder 530. The phase shifter 510 may, as an alternative, be placed at the output of the first adder.

In similarity to that which has been described above in connection to the modulator 300 of FIG. 3, at least one of the third and fourth XOR gates can have a phase shifter both at its clock frequency input port and at its output port, instead of at only one of these positions. This is the case with the example 500 that is shown in FIG. 5.

Suitably, at least one of the phase shifters of the third or fourth XOR gates is adapted to shift the phase of an input signal by ninety degrees.

Figure 6:
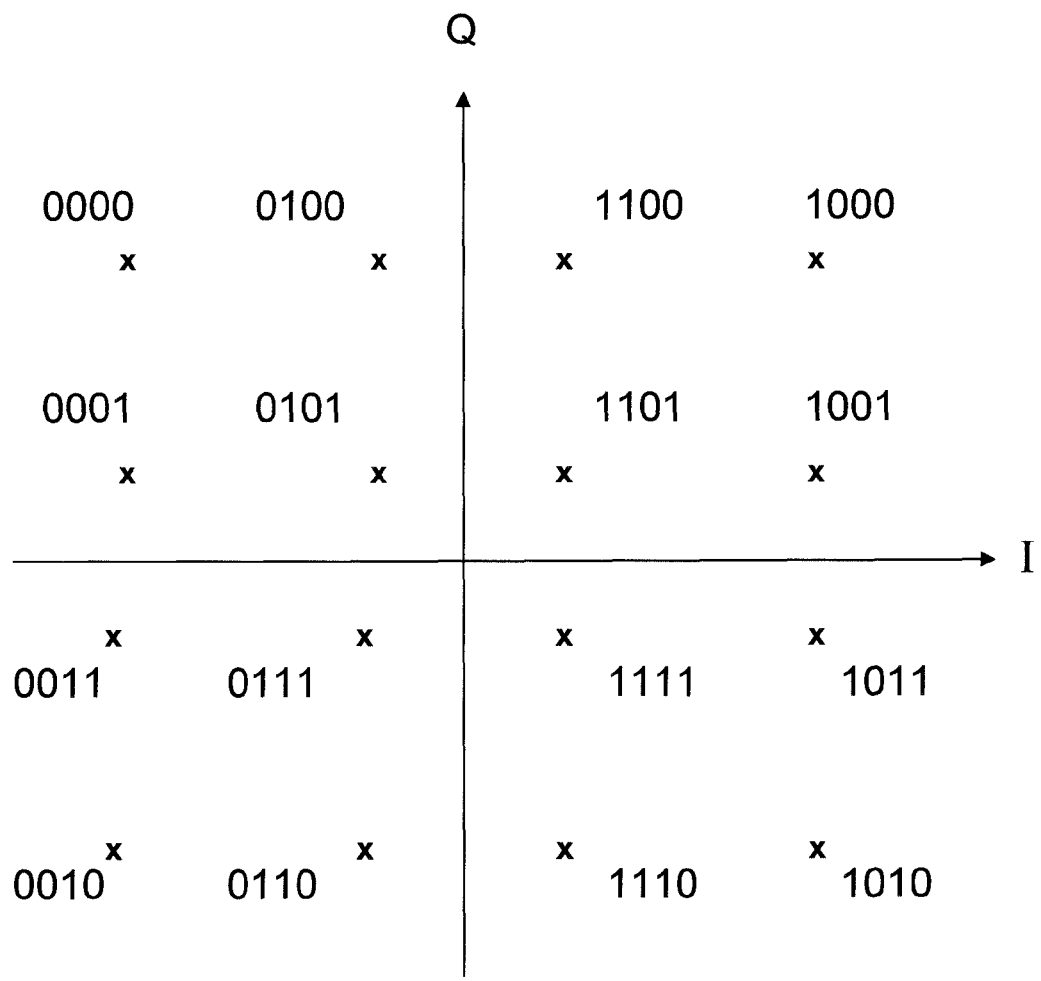
FIG. 6 shows a third modulation pattern.

FIG. 6 shows an example of a 16-QAM "space" or constellation of patterns which can be obtained by means of the modulator 500 of FIG. 5. The reason for the multiplier 520 of FIG. 5 will now become clear: as shown in FIG. 6, in 16-QAM, use is made not only of phase but also of amplitude in order to differentiate between the symbol positions. If the multiplication factor of the multiplier 520 is 2, the pattern of FIG. 6 will be obtained, but other multiplication factors may be used in order to obtain other patterns. The same is the case for the phase shift obtained by the phase shifter 530, i.e. other phase shifts than ninety degrees may be used in order to obtain other 16-QAM patterns than that shown in FIG. 6. In addition, as another alternative which will also yield the pattern of FIG. 6, the multiplication factor of the multiplier 520 may be ½.

In general, adjustments of the phase shifters in the invention can be used to modify and optimize the transitions between the symbol positions in the constellation diagrams, i.e. the diagrams shown in FIGS. 2, 4 and 6. Such modifications or optimizations of the transition paths between symbols or symbol positions in the constellation diagram can be used to minimize the bandwidth and power of the output signal from the modulator.

The invention is not limited to the examples of embodiments described above and shown in the drawings, but may be freely varied within the scope of the appended claims.

The invention claimed is:

1. A modulator for an electrical signal, comprising:
   a data input port;
   a clock frequency input port;
   a first phase shifter adapted to keep a phase of an input clock frequency signal aligned with a phase of a data stream which is input at the data input port independent of data values of the data stream;
   a first exclusive OR (XOR) gate with an output port, to which first XOR gate the input ports of the modulator are connected, by means of which a Binary Phase Shift Keying (BPSK) signal is created at the output port when a first data stream is connected to the data input port and a first clock frequency signal is connected to the clock frequency input port;
   a second XOR gate with a data input port, a clock frequency input port and an output port;
   a second phase shifter connected to the data input port of the second XOR gate;
   a third phase shifter connected to the output port of the second XOR gate; and
   a first adder for adding an output of the first XOR gate and an output of the third phase shifter, so that a Quadrature Phase Shift Keying (QPSK) signal is created when the first data stream and a second data stream are connected to the data input ports of the first and second XOR gates, respectively, and the first clock frequency signal and a second clock frequency signal at a same frequency are connected to the clock frequency input ports of the first and second XOR gates, respectively.

2. The modulator of claim 1, wherein the second phase shifter is adapted to shift a phase of a signal zero or ninety degrees.

3. The modulator of claim 1, further comprising:
third and fourth XOR gates, each with respective data input ports, clock frequency input ports and output ports;
a fourth phase shifter connected to the clock frequency input port of the third XOR gate;
a fifth phase shifter connected to the data input port or the output port of the fourth XOR gate;
a second adder for adding outputs of the third and fourth XOR gates;
a third adder for adding outputs of the first and second adders; and
a multiplier for multiplying an output of the second adder by a predetermined factor before being used by the third adder.

4. The modulator of claim 3, wherein the predetermined factor of the multiplier is two.

5. The modulator of claim 3, further comprising an additional phase shifter at the output of the first or second adder.

6. The modulator of claim 5, wherein the additional phase shifter serves to maintain zero degree difference in phase between inputs of the third adder.

\* \* \* \* \*